(12) United States Patent
Freund et al.

(10) Patent No.: US 10,436,075 B2
(45) Date of Patent: Oct. 8, 2019

(54) MULTI-PRESSURE ORGANIC RANKINE CYCLE

(71) Applicant: GENERAL ELECTRIC COMPANY, Schenectady, NY (US)

(72) Inventors: Sebastian W. Freund, Unterföhring (DE); Pierre Sébastien Huck, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/589,746

(22) Filed: Jan. 5, 2015

(65) Prior Publication Data

US 2016/0194983 A1     Jul. 7, 2016

(51) Int. Cl.
| | |
|---|---|
| F01K 25/10 | (2006.01) |
| F01K 13/00 | (2006.01) |
| F01K 23/02 | (2006.01) |
| F01K 23/10 | (2006.01) |
| F01K 25/08 | (2006.01) |
| F01K 11/00 | (2006.01) |

(52) U.S. Cl.
CPC .............. F01K 25/10 (2013.01); F01K 11/00 (2013.01); F01K 13/00 (2013.01); F01K 23/02 (2013.01); F01K 23/10 (2013.01); F01K 25/08 (2013.01)

(58) Field of Classification Search
CPC .......... F01K 23/00; F01K 23/02; F01K 23/04; F01K 25/00; F01K 25/06; F01K 25/08; F01K 25/10; F01K 25/106
USPC ................................... 60/651, 655, 664, 671
See application file for complete search history.

(56) References Cited

U.S. PATENT DOCUMENTS

| | | | | |
|---|---|---|---|---|
| 3,795,103 A | * | 3/1974 | Anderson | F01K 3/185 60/651 |
| 4,276,747 A | * | 7/1981 | Faldella | F01K 25/06 60/618 |
| 4,422,297 A | * | 12/1983 | Rojey | F01K 25/06 60/651 |

(Continued)

FOREIGN PATENT DOCUMENTS

| | | | |
|---|---|---|---|
| AT | 510809 A1 | * | 6/2012 |
| CN | 103775145 A | | 5/2014 |

(Continued)

OTHER PUBLICATIONS

PCT Search Report and Written Opinion issued in connection with corresponding PCT Application No. PCT/US2016/012130 dated Apr. 25, 2016.

(Continued)

Primary Examiner — Laert Dounis
(74) Attorney, Agent, or Firm — Baker Hughes Patent Organization (57) ABSTRACT

The present disclosure relates to a multi-pressure stage, organic Rankine cycle ("ORC") that includes a dry organic working fluid that may be split, such that a first portion of the working fluid flows through a high pressure stage and a second portion of the working fluid flows through a low pressure stage. Components of the high pressure stage and the low pressure stage may be heated by a heat source stream that may be split in a tee downstream of a high pressure evaporator and recombined in a mixer before entering a low pressure preheater.

14 Claims, 6 Drawing Sheets

(56) References Cited

U.S. PATENT DOCUMENTS

| | | | |
|---|---|---|---|
| 5,531,073 A | 7/1996 | Bronicki et al. | |
| 7,021,060 B1* | 4/2006 | Kalina | F01K 25/06 60/649 |
| 7,096,665 B2* | 8/2006 | Stinger | F01K 25/08 60/651 |
| 8,438,849 B2 | 5/2013 | Kaplan et al. | |
| 8,667,799 B2 | 3/2014 | Batscha | |
| 2010/0071368 A1* | 3/2010 | Kaplan | F01K 7/025 60/651 |
| 2010/0236241 A1* | 9/2010 | Kumar | F22G 5/12 60/653 |
| 2010/0305768 A1* | 12/2010 | Holt | F01K 13/02 700/288 |
| 2012/0131919 A1* | 5/2012 | Held | F01K 13/02 60/646 |
| 2013/0090395 A1 | 4/2013 | DiGenova et al. | |
| 2013/0174552 A1* | 7/2013 | Mahmoud | F01K 23/02 60/671 |
| 2013/0227947 A1* | 9/2013 | Bronicki | F03G 6/005 60/651 |
| 2013/0336768 A1* | 12/2013 | Higashimori | F01K 7/18 415/116 |
| 2013/0341929 A1 | 12/2013 | Ho et al. | |
| 2014/0026574 A1 | 1/2014 | Leibowitz et al. | |

FOREIGN PATENT DOCUMENTS

| | | | |
|---|---|---|---|
| WO | 2008/125827 A2 | 10/2008 | |
| WO | 2008125827 A2 | 10/2008 | |
| WO | 2009/056341 A2 | 3/2009 | |
| WO | WO 2009056341 A2 * | 5/2009 | F01K 23/02 |

OTHER PUBLICATIONS

Angelino, Gianfranco, et al., Multicomponent Working Fluids for Organic Rankine Cycles (Orcs), Pergamon, Jun. 1998, pp. 449-463, vol. 23, Issue 6.

Dai, Yiping, Parametric Optimization and Comparative Study of Organic Rankine Cycle (ORC) for Low Grade Waste Heat Recovery, Energy Conversion and Management, Mar. 2009, pp. 576-582, vol. 50, Issue 3.

Guo, Tao, et al., Fluid Selection for a Low-Temperature Geothermal Organic Rankine Cycle by Energy and Exergy, Mar. 28-31, 2010, pp. 1-5.

Machine Translation and First Office Action and Search issued in connection with corresponding CN Application No. 201680005065.2 dated Oct. 29, 2018.

* cited by examiner

MULTI-PRESSURE ORGANIC RANKINE CYCLE

BACKGROUND

The subject matter disclosed herein relates to a multi-pressure organic Rankine cycle using a dry organic working fluid.

Waste heat recovery systems may be employed to recover low-grade heat from industrial and commercial processes and operations. For example, waste heat recovery systems may be used to recover low-grade heat from hot exhaust gases produced by gas turbines. Waste heat recovery systems that implement an organic Rankine cycle (ORC) with an organic working fluid may be particularly efficient at recovering low-grade heat due to the relatively low phase change enthalpies of organic fluids.

Additionally, ORC systems can be utilized in geothermal power plants. Geothermal power plants seek to utilize natural reservoirs of steam and hot water (e.g., brine) to generate electricity. The steam and hot water from geothermal reservoirs is generally obtained at low-grade temperatures, and thus, an ORC system may be an efficient method for generating electricity using a geothermal reservoir heat source.

Traditional ORCs tend to be less efficient when the temperature of the heat source decreases. Therefore, a modified ORC system that can generate electricity using low-grade heat sources more efficiently is desired.

BRIEF DESCRIPTION

In one embodiment, an organic Rankine cycle includes a dry organic working fluid, a high pressure stage, and a low pressure stage. The high pressure stage includes a high pressure pump, a high pressure evaporator, and a high pressure expander. Similarly, the low pressure stage includes a low pressure pump, a low pressure evaporator, and a low pressure expander. The organic Rankine cycle also includes a mixer configured to combine a high pressure stream of the dry organic working fluid exiting the high pressure expander and a low pressure stream of the dry organic working fluid exiting the low pressure evaporator, wherein a mixed enthalpy stream exits the mixer and enters the low pressure expander. Also, the organic Rankine cycle has a condenser configured to condense the mixed enthalpy stream exiting the low pressure expander and a tee configured to split the mixed enthalpy stream exiting the condenser into the high pressure stream and the low pressure stream, wherein the high pressure stream enters the high pressure pump and the low pressure stream enters the low pressure evaporator.

In another embodiment, an organic Rankine cycle includes a dry organic working fluid, a high pressure stage, and a low pressure stage. The high pressure stage has a high pressure pump, a high pressure preheater, a high pressure evaporator, and a high pressure expander. Similarly, the low pressure stage has a low pressure pump, a low pressure preheater, a low pressure evaporator, and a low pressure expander. The organic Rankine cycle also includes a mixer configured to combine a high pressure stream of the dry organic working fluid exiting the high pressure expander and a low pressure stream of the dry organic working fluid exiting the low pressure evaporator, wherein a mixed enthalpy stream exits the mixer and enters the low pressure expander. Also, the organic Rankine cycle has a condenser configured to condense the mixed enthalpy stream exiting the low pressure expander and a tee configured to split the mixed enthalpy stream exiting the condenser into the high pressure stream and the low pressure stream, wherein the high pressure stream enters the high pressure pump and the low pressure stream enters the low pressure evaporator. Finally, the organic Rankine cycle includes a heat source stream configured to supply energy to the high pressure preheater, the high pressure evaporator, the low pressure preheater, the low pressure evaporator, or any combination thereof.

In another embodiment a method involves heating a high pressure stream comprising a dry organic working fluid in a high pressure evaporator, expanding the high pressure stream in a high pressure expander, combining, in a mixer, the high pressure stream with a low pressure stream comprising the dry organic working fluid to form a mixed enthalpy stream, expanding the mixed enthalpy stream in a low pressure expander, condensing the mixed enthalpy stream in a condenser, pumping the mixed enthalpy stream in a low pressure pump, splitting the mixed enthalpy stream into the high pressure stream and the low pressure stream in a tee, wherein the high pressure stream enters a high pressure pump before entering the high pressure evaporator and the low pressure stream enters a low pressure evaporator before entering the mixer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

In general, traditional ORC systems may circulate an organic working fluid in a closed loop through a cycle of expansion and pressurization to convert heat into work. For example, the working fluid may be directed through a heat exchanger where the working fluid may absorb heat from a heat source, such as geothermal water or steam (e.g., brine), to vaporize the working fluid. The organic working fluid possesses a boiling point that is less than the boiling point of water, which allows the ORC to effectively generate power from low-temperature heat sources. The vaporized working fluid may then be expanded across a turbine to drive a load, such as a generator, that produces electricity. The expanded working fluid may then be directed to another heat exchanger to condense the working fluid into a liquid. The liquid working fluid may then be pressurized in a pump and returned to the first heat exchanger where the cycle repeats. Typical ORC systems may employ a refrigerant, such as R134a or R245fa, as the organic working fluid and may operate at temperatures of approximately 80° C. to 200° C. However, it may be desirable to utilize other working fluids and operating temperatures when utilizing a multi-pressure system and a low-grade temperature heat source.

As discussed herein, multi-level ORC systems can be used to improve the efficiency of a traditional ORC system. A multi-level ORC can include stages that operate at different temperatures or at different pressures. ORC systems that utilize multiple cycles operating at different temperatures are generally configured in a cascade arrangement. A cascade arrangement includes two or more individual ORCs that each comprises a closed loop Rankine cycle. Cascade arrangements can thus take advantage of multiple working fluids that possess different thermodynamic properties to maximize efficiency. However, multi-level ORC systems operating at different temperatures require a higher temperature heat source in order to fully maximize the power output.

In certain embodiments discussed herein, multi-pressure ORC systems utilize at least two stages operating at different pressures. A multi-pressure ORC can also be arranged in a cascade formation. Alternatively, the multi-pressure ORC may be arranged such that two turbines or expanders are positioned in series, thereby combining the working fluid from a high pressure ORC and the working fluid from a lower pressure ORC. Such a configuration may be desirable because the high pressure working fluid exits a high pressure expander as a superheated vapor, and increases the temperature of the low pressure working fluid thereby requiring less overall energy input to the system. This feature of the ORC configuration enhances the efficiency of the overall system in comparison to traditional ORCs.

The present disclosure is directed to techniques for enhancing the efficiency of systems generating electricity from low-grade temperature heat sources, such as water or steam (e.g., brine) from a geothermal reservoir. Such an electricity generation system may include a modified organic Rankine cycle (ORC) that utilizes one, dry organic solvent as the working fluid, but contains at least two stages that operate at different pressures. The two stages may be desirable to reduce a temperature difference between the boiling working fluid and the heat source. The heat source may be used to boil the working fluid at a high pressure and temperature first, and then boil the working fluid at a lower pressure and temperature. Thus, two stages minimize the temperature differences during boiling and exploit as much of the available energy in the heat source as possible. To create the two stages, at least two expanders or turbines may be placed in series. The output from a high pressure expander may be mixed with a low pressure stream of the working fluid prior to entering a low pressure expander. This configuration may enhance efficiency because the output from the high pressure expander further heats the working fluid entering the low pressure expander without requiring additional energy input to the overall system. Therefore, less energy input is required than in traditional ORCs. Upon exiting the low pressure expander, the combined working fluid is condensed in a condenser and then is repressurized in one or more pumps.

An embodiment of the present disclosure may be utilized to generate electricity as part of a binary fluid geothermal power plant. Generally, geothermal power plants utilize geothermal reservoirs of steam and hot water (e.g., brine) as energy sources for the creation of electricity. Single fluid geothermal power plants send brine directly through at least one turbine or expander to generate electricity. Conversely, a binary fluid geothermal power plant incorporates heat exchangers such that the brine (i.e., the first fluid) transfers energy to a working fluid (i.e., the second fluid) in an ORC. In a binary fluid geothermal power plant, the working fluid in the ORC passes through the turbine or heat exchanger to generate electricity. The working fluid in an ORC generally has an evaporation temperature less than water thus requiring less energy to convert into a gaseous state.

A binary fluid geothermal power plant may provide for enhanced electricity generation. However, traditional binary fluid geothermal power plants tend to operate at low efficiencies when the geothermal source is available at only relatively low temperatures. As used herein, relatively low temperatures for a heat source may be between 100° C. and 200° C., between 120° C. and 160° C., between 130° C. and 150° C., or anywhere therebetween.

Figure 1:
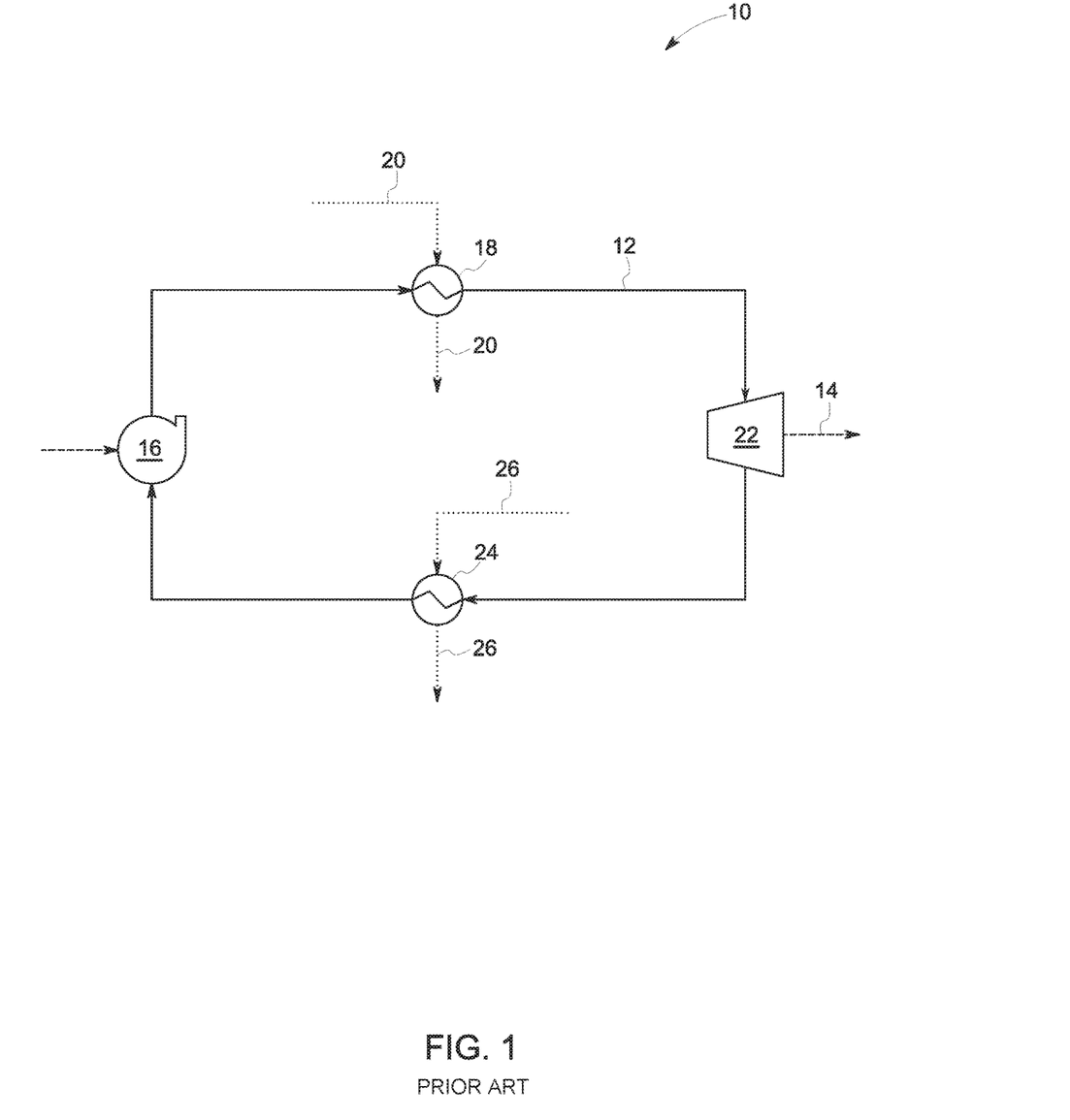
FIG. 1 shows an embodiment of a traditional organic Rankine cycle.

Turning to the figures, FIG. 1 shows an embodiment of a traditional, single stage ORC system 10 for reference. A working fluid 12 flows through the various components of the ORC 10 to generate power 14. The working fluid is sent through a pump 16 to pressurize the working fluid to a desired level. The working fluid then flows into an evaporator 18, where it is heated to a desired temperature. In certain embodiments, the evaporator 18 may be a heat exchanger such as a shell and tube heat exchanger, a plate heat exchanger, a plate and shell heat exchanger, or any other device configured to transfer energy from one stream of fluid to another stream of fluid. The evaporator 18 includes a heat source stream 20, which transfers energy from the heat source stream 20 to the working fluid 12. The heated working fluid 12 then flows into an expander 22 where the pressure of the working fluid 12 drops significantly. The pressure drop across the expander 22 can be used to generate power or electricity 14. The expander 22 may be a turbine or any other device capable of generating power through the expansion of a working fluid. After expansion, the working fluid 12 enters a condenser 24 to cool the working fluid 12 so that substantially all of the working fluid 12 is in liquid form before entering the pump 16. The condenser 24 may be a heat exchanger such as a shell and tube heat exchanger, a plate heat exchanger, a plate and shell heat exchanger, or any other device configured to transfer energy from one stream of fluid to another stream of fluid. The condenser 24 also includes a heat sink stream 26 that absorbs energy from the working fluid 12 enabling the working fluid 12 to change from a gaseous state to a liquid state.

The traditional ORC system 10 generates power at a relatively low efficiency when the heat source stream 20 includes a low-temperature fluid. Therefore, it is desirable to modify the traditional ORC system 10 so that power generation may be more efficient when only a low-temperature heat source stream is available.

Figure 2:
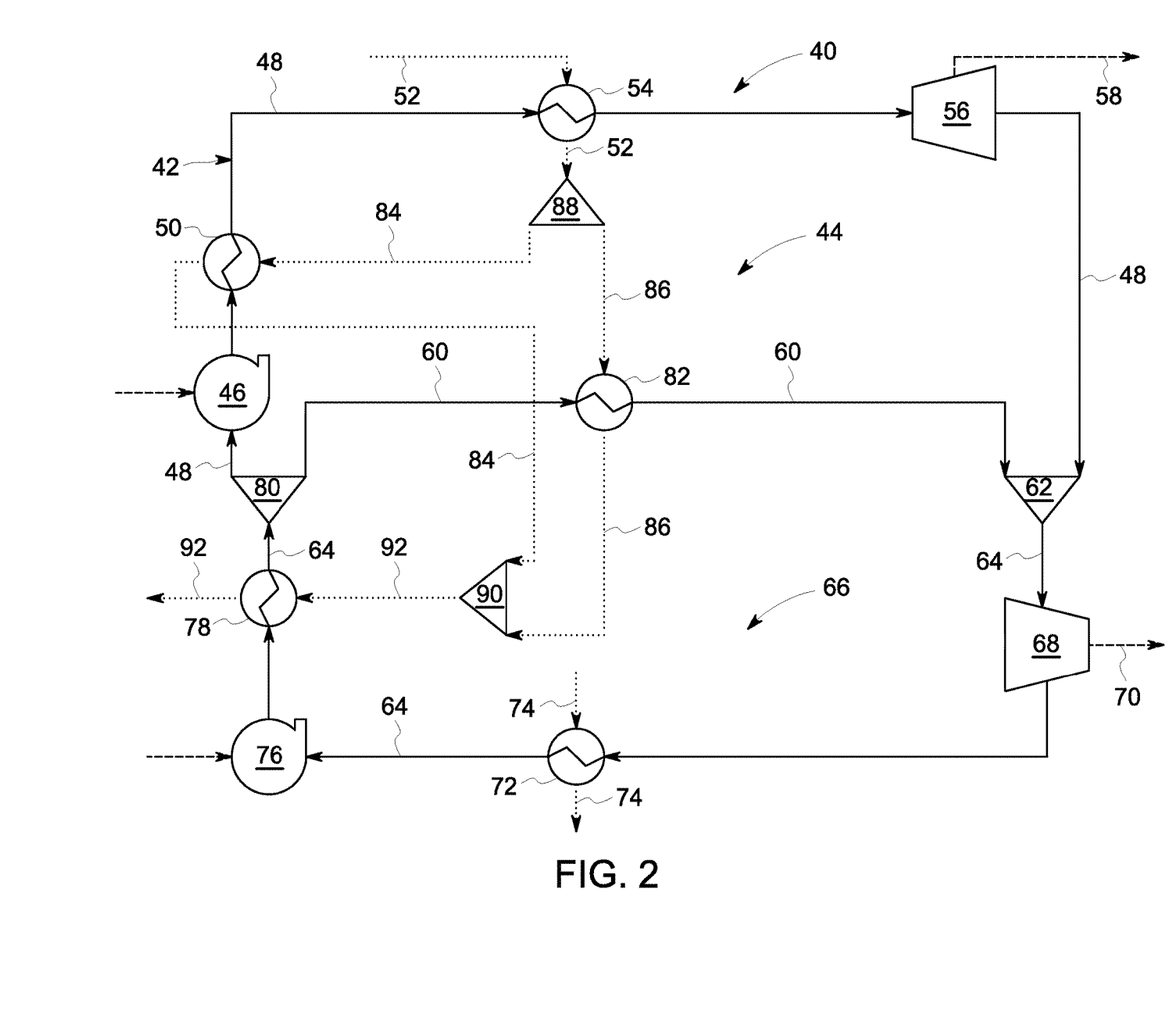
FIG. 2 shows an embodiment of the present disclosure that illustrates a modified organic Rankine cycle system that includes two pressure stages with two expanders arranged in series.

FIG. 2 shows an embodiment of the present disclosure that may increase the efficiency of an ORC system using a low-temperature heat source stream by modifying the traditional ORC system 10. FIG. 2 shows a modified ORC system 40 that includes two pressure stages that utilize a single working fluid 42.

In certain embodiments, the working fluid 42 may be a dry organic fluid. For example, the working fluid 42 may be isobutane, butane, n-pentane, isopentane, isohexane, hexane, a siloxane, R245fa, any substance that exhibits a positive slope on the saturation line of a T-S diagram (i.e., is "dry"), or any combination thereof, among others. By having a positive slope along the saturation line of the temperature-entropy (T-S) diagram, the working fluid is likely to superheat rather than condense upon expansion. Additionally, the overall power input required for the system may decrease substantially when utilizing a dry organic fluid as the working fluid because of the low boiling points of such fluids. The use of a dry organic fluid as the working fluid is particularly well-suited to generate power from a low-grade temperature heat source. In other embodiments, non-dry organic fluids may be used as the working fluid, such as propane, R134a, or a combination thereof.

FIG. 2 shows one embodiment of the modified ORC system 40 that includes a high pressure stage 44 with a high pressure pump 46 that is enabled to increase a pressure of a high pressure stream 48 of the working fluid 42. In certain embodiments, the high pressure stream 48 exits the high pressure pump 46 and enters a high pressure preheater 50 where energy is transferred to the high pressure stream 48 to increase the high pressure stream's 48 temperature. The high pressure preheater 50 may be a heat exchanger such as a shell and tube heat exchanger, a double pipe heat exchanger, a plate heat exchanger, a plate and shell heat exchanger, or any other device configured to transfer energy from one stream of fluid to another stream of fluid. The high pressure stream 48 may then enter a high pressure evaporator 54 where the high pressure stream 48 absorbs energy from a heat source stream 52. Upon absorbing energy from the heat source stream 52, the temperature of the high pressure stream 48 increases. In certain embodiments, the high pressure stream 48 is substantially all in a gaseous phase when exiting the high pressure evaporator 54. For example, the high pressure stream 48 may exit the high pressure evaporator 54 as a superheated vapor and may contain between 0 Kelvin of superheat and 10 Kelvin of superheat; between 0 Kelvin of superheat and 15 Kelvin of superheat; between 0 Kelvin of superheat and 20 Kelvin of superheat; or anywhere therebetween upon exiting the high pressure evaporator 54. Additionally, the high pressure evaporator 54 may be a heat exchanger such as a shell and tube heat exchanger, a double pipe heat exchanger, a plate heat exchanger, a plate and shell heat exchanger, or any other device configured to transfer energy from one stream of fluid to another stream of fluid.

After exiting the high pressure evaporator 54, the high pressure stream 48 may enter a high pressure expander 56. In certain embodiments, the high pressure expander 56 is configured to rapidly expand the high pressure stream 48 and generate power 58 by converting a significant pressure drop of the high pressure stream 48 into work. The high pressure expander 56 may be a turbine or any other device configured to expand a working fluid and generate power. After exiting the high pressure expander 56, the high pressure stream 48 may remain a superheated vapor.

After exiting the high pressure expander 56, the high pressure stream 48 may combine with a low pressure stream 60 of the working fluid 42 in a first mixer 62 to form a mixed enthalpy stream 64. The low pressure stream 60 is part of a low pressure stage 66 of the overall ORC 40. In certain embodiments, the low pressure stream 60 enters the first mixer 62 at a lower temperature than the high pressure stream 48. Therefore, in certain embodiments, the mixed enthalpy stream 64 exiting the first mixer 62 has a higher temperature than the low pressure stream 60, but a lower temperature than the high pressure stream 48. Also, in certain embodiments, the mixed enthalpy stream 64 may be substantially all saturated gas with substantially no superheat and substantially no liquid. By combining the high pressure stream 48 and the low pressure stream 60 in the first mixer 62, the amount of heat input required for the stream entering a low pressure expander 68 substantially decreases because of the heat being transferred from the high pressure stream 48 consisting of superheated vapor to the low pressure stream 60 consisting of nearly saturated fluid. As a non-limiting example, the modified ORC system may generate a 2 percent net power increase by placing the high pressure expander 56 in series with the low pressure expander 68 and reducing inlet superheat by increasing the low-pressure working fluid mass flow.

The mixed enthalpy stream 64 may enter the low pressure expander 68, such that the low pressure expander 68 is in series with the high pressure expander 56. The low pressure expander 66 is configured to rapidly expand the mixed enthalpy stream 64 and generate power 70 by converting a significant pressure drop of the mixed enthalpy stream 64 into work. The high pressure expander 68 may be a turbine or any other device configured to expand a working fluid and generate power.

Upon exiting the low pressure expander 68, the mixed enthalpy stream 64 may enter a condenser 72. In certain embodiments, the condenser 72 may be configured to cool the mixed enthalpy stream 64 such that substantially all of the working fluid 42 in the mixed enthalpy stream 64 exiting the condenser 72 is in a liquid phase. The condenser may include a heat sink stream 74. The heat sink stream may absorb heat from the mixed enthalpy stream 64 such that the mixed enthalpy stream's 64 temperature decreases in the condenser 72. The heat sink stream may comprise a fluid with a temperature substantially less than the temperature of the mixed enthalpy stream 64 entering the condenser 72. As a non-limiting example, the heat sink stream may be water with a temperature between 5° C. and 25° C. or the ambient air temperature. In certain configurations, the condenser 72 may be a heat exchanger such as a shell and tube heat exchanger, a plate heat exchanger, a fin-tube heat exchanger, or any other device configured to transfer energy from one stream of fluid to another stream of fluid.

The mixed enthalpy stream 64 may exit the condenser 72 and enter a low pressure pump 76. The low pressure pump 76 is configured such that the mixed enthalpy stream 64 exiting the low pressure pump 76 has a higher pressure than the mixed enthalpy stream 64 entering the low pressure pump 76. In certain embodiments, the mixed enthalpy stream 64 may also enter a low pressure preheater 78 after exiting the low pressure pump 76. The low pressure preheater 78 transfers energy from a heat source stream 52 or another heat source stream to the mixed enthalpy stream 64. The low pressure preheater 78 may be a heat exchanger such as a shell and tube heat exchanger, a double pipe heat exchanger, a plate heat exchanger, a plate and shell heat exchanger, or any other device configured to transfer energy from one stream of fluid to another stream of fluid.

In certain embodiments, the mixed enthalpy stream 64 exiting the low pressure preheater 78 may then be split into the high pressure stream 48 of the working fluid 42 and the low pressure stream 60 of the working fluid 42 in a first tee 80. The first tee 80 directs the high pressure stream 48 to the high pressure stage 44 and the low pressure stream 60 to the low pressure stage 66. The high pressure stream 48 may then enter the high pressure pump 46, and the cycle continues. The low pressure stream 60 may enter a low pressure evaporator 82. The low pressure evaporator 82 transfers energy from the heat source stream 52 or another heat source stream to the low pressure stream 60 such that the low pressure stream 60 exiting the low pressure evaporator 82 has a higher temperature than the low pressure stream 60 entering the low pressure evaporator 82. As discussed above, the low pressure stream 60 exiting the low pressure evaporator 82 may consist of the working fluid 42 primarily in a saturated liquid phase. The low pressure evaporator 82 may be a heat exchanger such as a shell and tube heat exchanger, a double pipe heat exchanger, a plate heat exchanger, a plate and shell heat exchanger, or any other device configured to transfer energy from one stream of fluid to another stream of fluid. After exiting the low pressure evaporator 82, the low pressure stream 60 may combine with the high pressure stream 48 in the first mixer 62 where the overall modified ORC system 40 continues to run.

In one embodiment, the heat source stream 52 of the modified ORC system 40 may be split into a high pressure preheating stream 84 and a low pressure evaporating stream 86 with a heat source tee 88. In some embodiments a ratio of the high pressure preheating stream 84 to the low pressure evaporating stream 86 may be 30/70, 40/60, 50/50, or anywhere therebetween. The high pressure preheating stream 84 may act as a heat source for the high pressure preheater 50 and the low pressure evaporating stream 86 may act as a heat source for the low pressure evaporator 82. After the high pressure preheating stream 84 exits the high pressure preheater 50 and the low pressure evaporating stream 86 exits the low pressure evaporator 82, the two streams 84, 86 may be mixed in a heat source mixer 90 to create a mixed heat source stream 92. In certain embodiments, the mixed heat source stream 92 may be used as a heat source for the low pressure preheater 78. Splitting the heat source stream 52 may enable the modified ORC system 40 to operate more efficiently than traditional ORCs. As a non-limiting example, splitting the heat source stream 52 downstream from the high pressure evaporator 54 may increase the net power gain of the modified ORC system 40 by 3 percent. Therefore, when combined with the potential 2 percent net power gain caused by placing the high pressure expander 56 in series with the low pressure expander 68, the modified ORC system 40 may generate a net power gain of 5 percent or more, for example.

In another embodiment, the heat source stream 52 may not be split, but rather, may flow through the high pressure evaporator 54, the high pressure preheater 50, the low pressure evaporator 82, and the low pressure preheater 78 in any order. In another embodiment, the high pressure evaporator 54, the high pressure preheater 50, the low pressure evaporator 82, and the low pressure preheater 78 may also have separate heat source streams. The separate heat source streams may or may not have different temperatures. Finally, in one embodiment, the high pressure preheating stream 84 and the low pressure evaporating stream 86 may not combine in the heat source mixer 90 and either the high pressure preheating stream 84 or the low pressure evaporating stream 86, alone, may be the heat source of the low pressure preheater 78. Alternatively, the low pressure preheater 78 may have a separate heat source stream.

It should be appreciated by those with skill in the art that additional pumps, preheaters, evaporators, expanders, and condensers may be utilized in the modified ORC system 40 in addition to those specifically mentioned above. For example, the modified ORC system 40 may include more than one preheater upstream from an evaporator. Adding additional preheaters can decrease the energy input required to run the modified ORC system 40.

Figure 3:
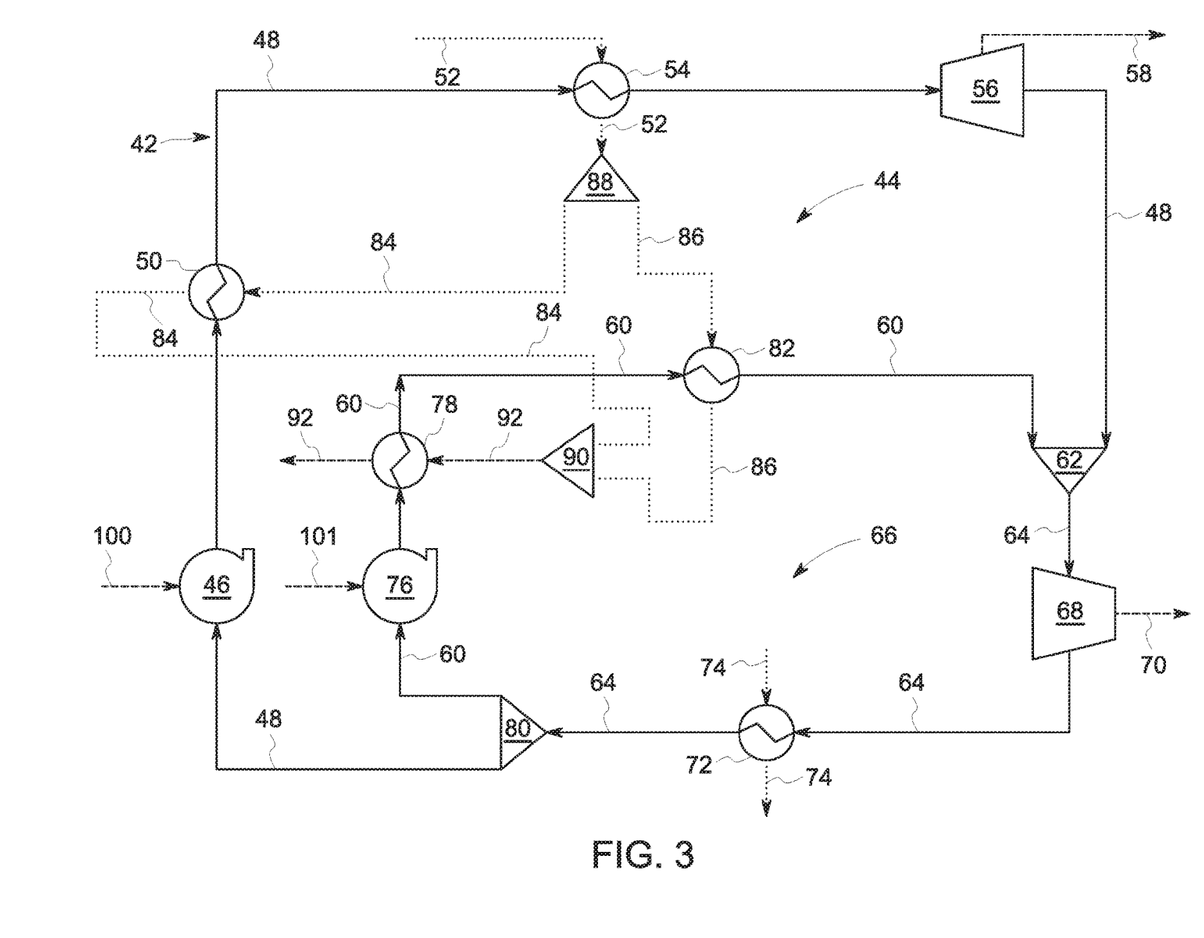
FIG. 3 shows another embodiment of the present disclosure that illustrates a modified organic Rankine cycle system that includes two pressure stages with two expanders arranged in series.

FIG. 3 shows another embodiment of the present disclosure. In FIG. 3, the first tee 80 is positioned upstream of the low pressure pump 76. FIG. 3 shows the first tee 80 splitting the mixed enthalpy stream 64 into the high pressure stream 48 and the low pressure stream 60 prior to the mixed enthalpy stream 64 entering the low pressure pump 76. Therefore, the high pressure stream 48 enters the high pressure pump 46 and the low pressure stream 60 enters the low pressure pump 76 after exiting the first tee 80. In certain embodiments, the high pressure pump 46 has a power input 100 greater than a power input 101 to the low pressure pump 76 so that the high pressure stream 48 may reach a higher pressure upon exiting the high pressure pump 46 than the low pressure stream 60 exiting the low pressure pump 76. Additionally, in the embodiment shown in FIG. 3 the mixed enthalpy stream 64 does not pass through the low pressure preheater 78. Rather, the mixed enthalpy stream 64 splits into the high pressure stream 48 and the low pressure stream 60 upstream from the low pressure preheater 78 such that only the low pressure stream 60 flows through the low pressure preheater 78.

FIG. 3 also illustrates the heat source stream 52 being split in the heat source tee 88 and then distributing the high pressure preheating stream 84 to the high pressure preheater 50 and the low pressure evaporating stream 86 to the low pressure evaporator 82. However, it should be appreciated by those skilled in the art that the high pressure evaporator 54, the high pressure preheater 50, and the low pressure evaporator 82, may use alternative heat source configurations as mentioned with respect to the embodiments discussed above.

Figure 4:
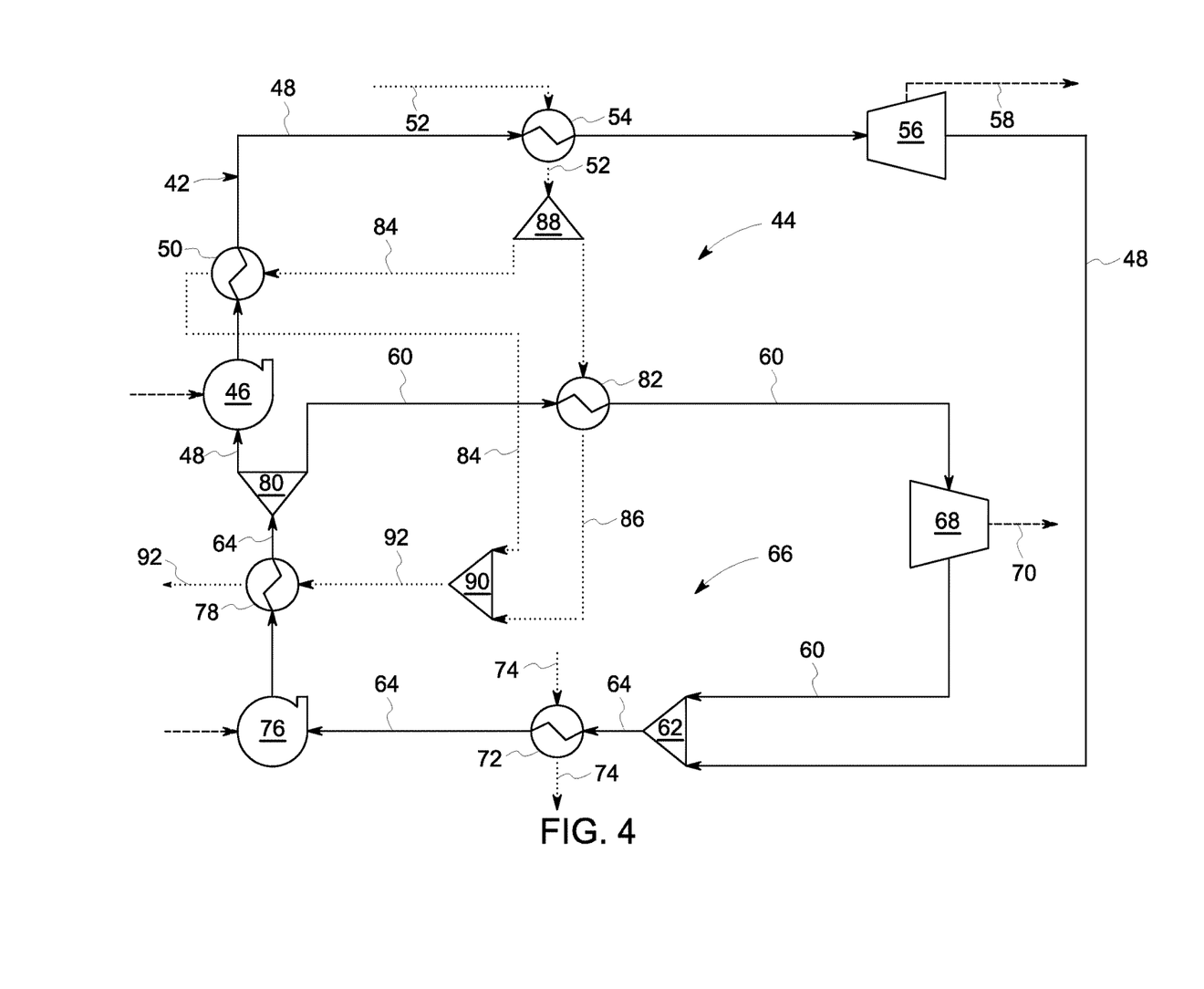
FIG. 4 shows another embodiment of the present disclosure that illustrates a modified organic Rankine cycle system that includes two pressure stages with two expanders arranged in parallel.

FIG. 4 shows another embodiment of the present disclosure. In FIG. 4 the high pressure expander 56 and the low pressure expander 68 are in a parallel configuration as opposed to the series configuration portrayed in FIGS. 2 and 3. Therefore, the low pressure stream 60 enters the low pressure expander 68 prior to the first mixer 62. Similarly, the high pressure stream 48 combines with the low pressure stream 60 downstream from the low pressure expander 68 such that the high pressure stream 48 never enters the low pressure expander 68 in the form of the mixed enthalpy stream 64.

Again, FIG. 4 also illustrates the heat source stream 52 being split in the heat source tee 88 and then distributing the high pressure preheating stream 84 to the high pressure preheater 50 and the low pressure evaporating stream 86 to the low pressure evaporator 82. However, it should be appreciated by those skilled in the art that the high pressure evaporator 54, the high pressure preheater 50, the low pressure evaporator 82, and the low pressure preheater 78 may use alternative heat source configurations as mentioned with respect to the embodiments discussed above.

Figure 5:
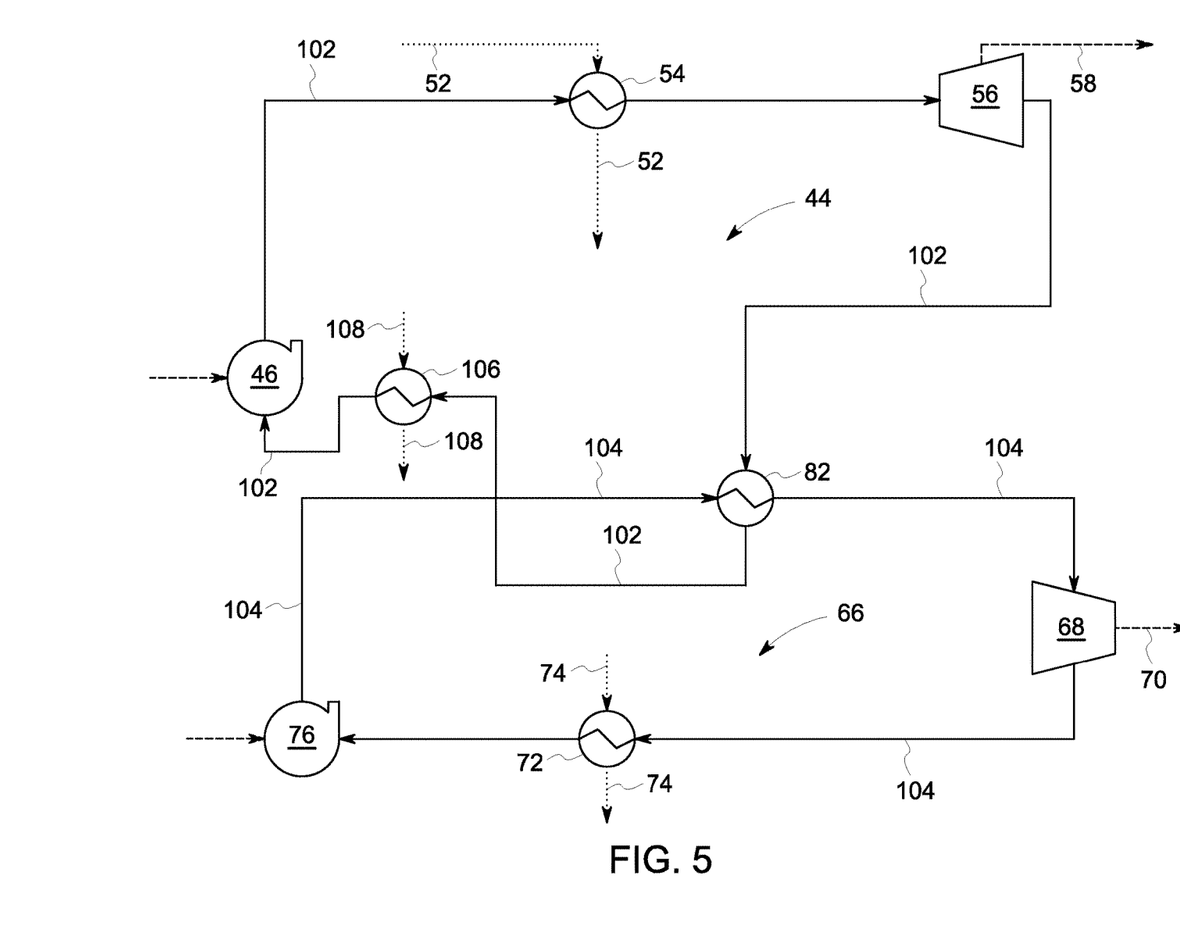
FIG. 5 shows another embodiment of the present disclosure that illustrates a modified organic Rankine cycle system that includes two pressure stages arranged in a cascade configuration.

FIG. 5 shows another embodiment of the present disclosure. In FIG. 5 the high pressure stage 44 and the low pressure stage 66 are separate cycles that each have a separate working fluid 102, 104. The high pressure stage 44 has a high pressure working fluid 102 and the low pressure stage has a low pressure working fluid 104. In certain embodiments, the high pressure working fluid 102 and the low pressure working fluid 104 may have the same composition. In alternate embodiments, the high pressure working fluid 102 and the low pressure working fluid 104 may have different compositions. FIG. 5 shows an embodiment where the high pressure working fluid 102 is used as a heat source for the low pressure evaporator 82. In alternative embodiments, the heat source for the low pressure evaporator 82 may be the heat source stream 52 used with the high pressure evaporator 54. In other embodiments, the high pressure working fluid 102 may not be used as a heat source, and the low pressure evaporator 82 may use a separate heat source.

FIG. 5 also includes a second condenser 106. The second condenser 106 shown in FIG. 5 may be configured to cool the high pressure working fluid 102 exiting the low pressure evaporator 82 such that the high pressure working fluid 102 exiting the second condenser 106 is substantially all liquid. In certain configurations, the second condenser may utilize a second heat sink stream 108. In other embodiments, the second condenser may utilize the heat sink stream 74 of the first condenser 72.

Figure 6:
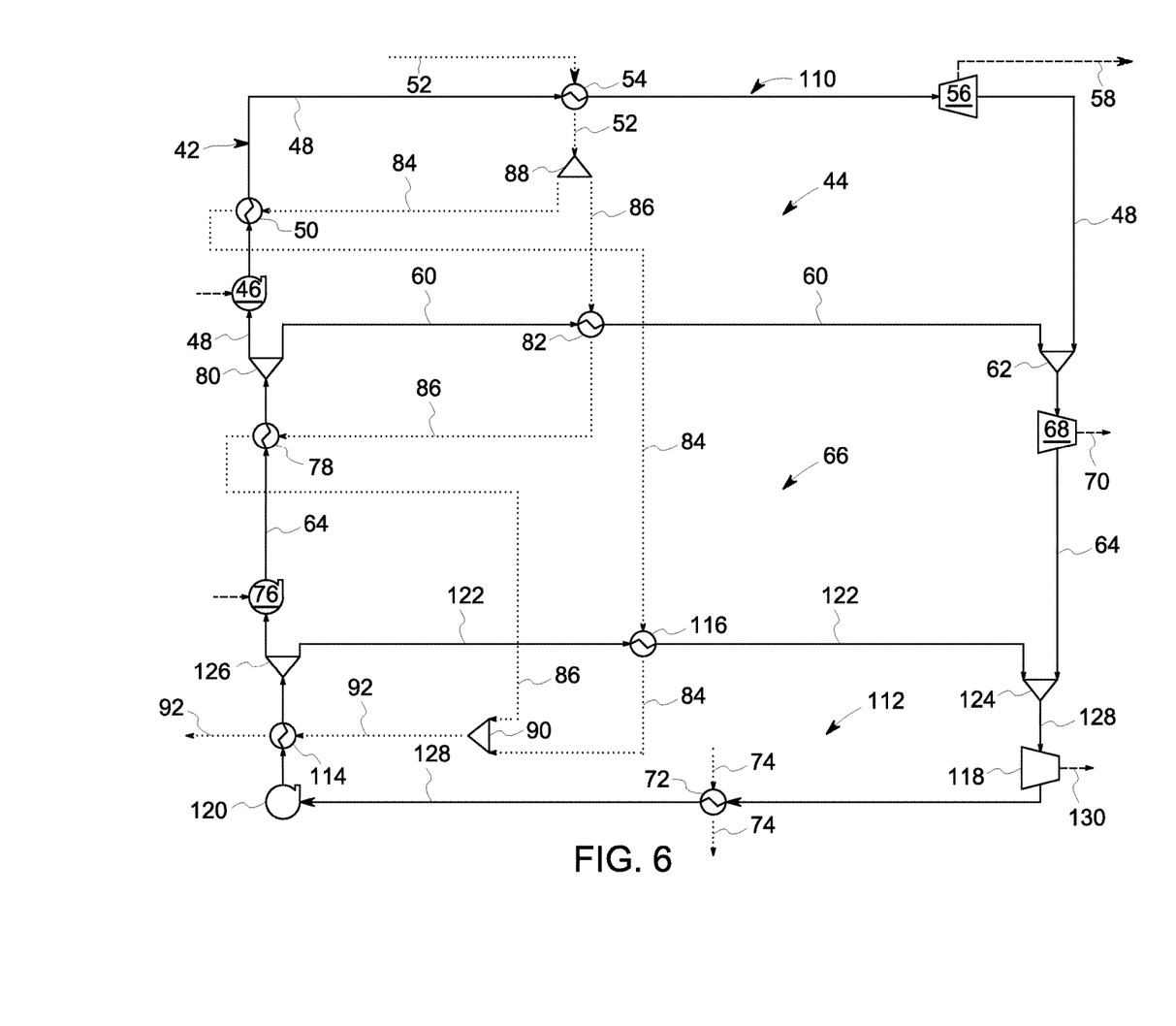
FIG. 6 shows another embodiment of the present disclosure that illustrates a modified organic Rankine cycle system that includes three pressure stages with three expanders arranged in series.

Additionally, certain embodiments may include more than two pressure stages as illustrated in FIG. 6, for example. FIG. 6 illustrates one embodiment of the present disclosure, and shows a modified ORC system 110 that includes three pressure stages. The modified ORC system 110 of FIG. 6 includes a third pressure stage 112 in addition to the high pressure stage 44 and the low pressure stage 66 of the modified ORC system 40. The third pressure stage 112 includes a third pressure preheater 114, a third pressure evaporator 116, a third pressure expander 118, a third pressure pump 120, and a third stream 122 of the working fluid 42. Additionally, a second mixer 124 and a second tee 126 may be included. The modified ORC system 110 of FIG. 6 operates in a similar manner to the modified ORC system 40 of FIG. 2, but includes an additional pressure stage.

FIG. 6. shows an embodiment where instead of entering the condenser 72, the mixed enthalpy stream 64 enters the second mixer 124 where it combines with the third stream 122 forming a second mixed enthalpy stream 128. The second mixed enthalpy stream 128 may enter the third pressure expander 118 where a pressure drop is created between the second mixed enthalpy stream 128 entering the expander 118 and the second mixed enthalpy stream 128 exiting the expander 128. The pressure drop may be used to generate power 130. The third pressure expander 118 may be configured to rapidly expand the second mixed enthalpy stream 128 and to generate power 130 by converting a significant pressure drop of the second mixed enthalpy stream 128 into work. The third pressure expander 118 may be a turbine or any other device configured to expand a working fluid and generate power.

The second mixed enthalpy stream 128 may then enter the condenser 72 where the second mixed enthalpy stream 128 is cooled so that substantially all of the second mixed enthalpy stream 128 may be in a liquid phase. Next, the second mixed enthalpy stream 128 may enter the third pressure pump 120 and the third pressure preheater 114. In certain embodiments, the third pressure preheater 114 may utilize the same heat source stream 52 as the high pressure evaporator 54, the high pressure preheater 50, the low pressure evaporator 82, and/or the low pressure preheater 78. In alternate embodiments, the third pressure preheater 114 may include a separate heat source stream. In certain embodiments, the third pressure preheater 114 may be a heat exchanger such as a shell and tube heat exchanger, a double pipe heat exchanger, a plate heat exchanger, a plate and shell heat exchanger, or any other device configured to transfer energy from one stream of fluid to another stream of fluid.

Finally, the second mixed enthalpy stream 128 may be split into the mixed enthalpy stream 64 and the third stream 122 in the second tee 126. The third stream 122 may then enter the third pressure evaporator 116. In certain embodiments, the third pressure evaporator 116 may utilize the same heat source stream 52 as the high pressure evaporator 54, the high pressure preheater 50, the low pressure evaporator 82, and/or the low pressure preheater 78. In alternate embodiments, the third pressure evaporator 116 may include a separate heat source stream or share the same heat source as the third pressure preheater 114. In certain embodiments, the third pressure evaporator 116 may be a heat exchanger such as a shell and tube heat exchanger, a double pipe heat exchanger, a plate heat exchanger, a plate and shell heat exchanger, or any other device configured to transfer energy from one stream of fluid to another stream of fluid.

It should be understood by those skilled in the art that embodiments of the present disclosure may include more than three pressure stages. In the case of more than three pressure stages, a stream of working fluid exiting a given expander combines with the next lowest pressure stage's working fluid prior to entering that next lower pressure stage's expander. This process continues until no more pressure stages exist. Once no more pressure stages exist, the stream exiting the final pressure stage's expander enters into a condenser before the stream is cycled back into the system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. An organic Rankine cycle comprising:
a dry organic working fluid flowing in a high pressure stream, an intermediate pressure stream, and a low pressure stream;
a high pressure stage through which the high pressure stream flows comprising a high pressure pump, a high pressure evaporator, a high pressure expander, and a high pressure preheater, wherein the high pressure stream exits the high pressure evaporator as superheated vapor and enters the high pressure expander and remains superheated vapor after exiting the high pressure expander;

an intermediate pressure stage through which the intermediate pressure stream flows comprising an intermediate pressure pump, an intermediate pressure evaporator, an intermediate pressure expander, and an intermediate pressure preheater, wherein the intermediate pressure stage is fluidly coupled to the high pressure stage;

a low pressure stage through which the low pressure stream flows comprising a low pressure pump, a low pressure evaporator, a low pressure expander and a low pressure preheater, wherein the low pressure stage is fluidly coupled to the intermediate pressure stage;

a heat source stream in a first heat exchange relationship with the high pressure evaporator;

a first mixer configured to combine the high pressure stream exiting the high pressure expander as superheated vapor and the intermediate pressure stream exiting the intermediate pressure evaporator and thereby increase a first net power gain of the organic Rankine cycle, wherein the intermediate pressure stream comprises nearly saturated fluid, and the intermediate pressure stream enters the first mixer at a temperature lower than the high pressure stream, and further wherein a mixed enthalpy stream exits the first mixer and comprises substantially all saturated gas with substantially no superheat, wherein the first mixer transfers heat from the high pressure stream comprising superheated vapor to the intermediate pressure stream comprising nearly saturated fluid and thereby substantially decreases an amount of heat input required for the mixed enthalpy stream entering the intermediate pressure expander;

a heat source tee configured to split the heat source stream into a high pressure preheating stream and an intermediate pressure evaporating stream and thereby increase a second net power gain of the organic Rankine cycle, wherein the heat source tee is positioned downstream of the high pressure evaporator in a direction of flow of the heat source stream, and wherein the high pressure preheating stream is a heat source for the high pressure preheater in a second heat exchange relationship with the high pressure preheater, and the intermediate pressure evaporating stream is a heat source for the intermediate pressure evaporator; and a heat source mixer configured to combine the high pressure preheating stream and the intermediate pressure evaporating stream downstream of the high pressure preheater and the intermediate pressure evaporator in the direction of flow of the heat source stream to form a mixed heat source stream that is in a fourth heat exchange relationship with the low pressure preheater, wherein the high pressure preheating stream is fluidly coupled to the low pressure evaporator downstream of the high pressure preheater.

2. The organic Rankine cycle of claim 1, wherein a first pressure of the high pressure stream is larger than a second pressure of the intermediate pressure stream, and the high pressure preheating stream acts as a heat source for the low pressure evaporator.

3. The organic Rankine cycle of claim 1, wherein the high pressure evaporator and the intermediate pressure evaporator are arranged in series, and the intermediate pressure evaporator is downstream from the high pressure evaporator in the direction of flow of the heat source stream.

4. The organic Rankine cycle of claim 1, wherein the high pressure preheating stream is fluidly coupled to the low pressure evaporator upstream of the heat source mixer.

5. The organic Rankine cycle of claim 1, further comprising a first tee configured to split a fluid stream into a first stream directed towards the high-pressure pump and a second stream directed towards the intermediate pressure evaporator.

6. The organic Rankine cycle of claim 1, wherein the heat source tee is configured to output a ratio of the high pressure preheating stream to the intermediate pressure evaporating stream of 30/70, 40/60, 50/50, or anywhere therebetween.

7. The organic Rankine cycle of claim 1, wherein the first mixer is configured to combine the high pressure stream exiting the high pressure expander and the intermediate pressure stream exiting the intermediate pressure evaporator such that the high pressure expander and the intermediate pressure expander are arranged in series.

8. The organic Rankine cycle of claim 7, further comprising a second mixer configured to combine the mixed enthalpy stream exiting the intermediate pressure expander and a third stream of the working fluid exiting the low pressure evaporator such that the intermediate pressure expander and the low pressure expander are arranged in series.

9. The organic Rankine cycle of claim 8, wherein a second mixed enthalpy stream exits the second mixer.

10. The organic Rankine cycle of claim 9, further comprising a second tee configured to split the second mixed enthalpy stream into the third stream of the working fluid and the fluid stream.

11. The organic Rankine cycle of claim 1, wherein the dry organic working fluid comprises isobutane, siloxane, R245fa, or any combination thereof.

12. The organic Rankine cycle of claim 8, wherein the mixed enthalpy stream comprises substantially no liquid.

13. The organic Rankine cycle of claim 9, wherein the second mixed enthalpy stream enters the low pressure expander.

14. The organic Rankine cycle of claim 13, wherein the second mixed enthalpy stream enters a condenser after the low pressure expander where it is cooled so that substantially all of the second mixed enthalpy stream is in a liquid phase.

* * * * *